United States Patent [19]

Schmider

[11] Patent Number: 5,006,765
[45] Date of Patent: Apr. 9, 1991

[54] DC MOTOR WITH CORELESS COIL INSTALLATION

[75] Inventor: Fritz Schmider, Hornberg, Fed. Rep. of Germany

[73] Assignee: Papst-Motoren GmbH & Co. KG, St. Georgen, Fed. Rep. of Germany

[21] Appl. No.: 317,034

[22] Filed: Feb. 28, 1989

Related U.S. Application Data

[63] Continuation of Ser. No. 161,303, Feb. 25, 1988, abandoned, which is a continuation of Ser. No. 22,395, Mar. 6, 1987, abandoned.

[30] Foreign Application Priority Data

Mar. 6, 1986 [DE] Fed. Rep. of Germany ....... 3607289

[51] Int. Cl.⁵ .................... H02K 21/22; H02K 29/06
[52] U.S. Cl. ........................ 310/71; 29/598; 336/192; 310/67 R; 310/208
[58] Field of Search .......... 310/67 R, 42, 43, 71, 310/208, 234, 237, 261, 265, 266, 91, 254; 336/192, 199, 200; 29/598

[56] References Cited

U.S. PATENT DOCUMENTS

| | | | |
|---|---|---|---|
| 3,486,056 | 12/1969 | Vuillemot | 310/237 |
| 3,735,171 | 5/1973 | van de Griend | 310/237 |
| 4,099,077 | 7/1978 | Maekawa | 310/237 |
| 4,110,901 | 9/1978 | Nakamura et al. | 310/42 |
| 4,323,805 | 4/1982 | Caby et al. | 310/237 |
| 4,398,167 | 8/1983 | Dickie et al. | 310/266 |
| 4,629,919 | 12/1986 | Merkle | 310/67 R |
| 4,633,110 | 12/1986 | Genco et al. | 310/71 |

FOREIGN PATENT DOCUMENTS

| | | |
|---|---|---|
| 1188709 | 3/1965 | Fed. Rep. of Germany . |
| 2345150 | 3/1975 | Fed. Rep. of Germany . |
| 2532551 | 2/1977 | Fed. Rep. of Germany . |
| 2810821 | 9/1979 | Fed. Rep. of Germany . |
| 3023601C2 | 6/1980 | Fed. Rep. of Germany . |
| 58-9565 | 1/1983 | Japan ............ 310/DIG. 6 |
| 2125635 | 3/1984 | United Kingdom . |
| 2171854 | 9/1986 | United Kingdom . |

Primary Examiner—William H. Beha, Jr.
Assistant Examiner—D. L. Rebsch
Attorney, Agent, or Firm—Fitch, Even, Tabin & Flannery

[57] ABSTRACT

In a coreless coil type cylindrical air gap dc motor, a ring flange is provided. Connections to the coil are formed in the ring flange by conductor paths in the form of stamped metal strips lying in a plane. The conductor paths in turn have connecting tongues which are directed radially with respect to the ring flange.

14 Claims, 3 Drawing Sheets

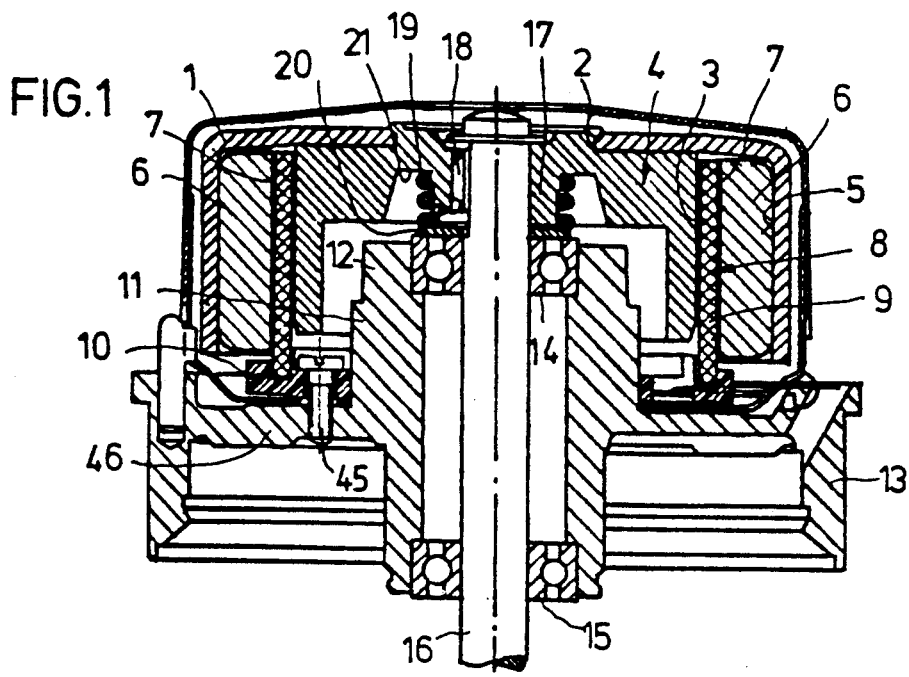
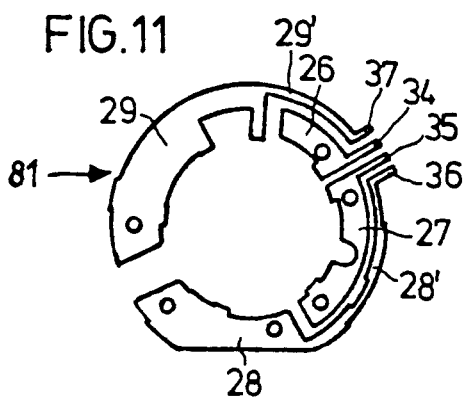
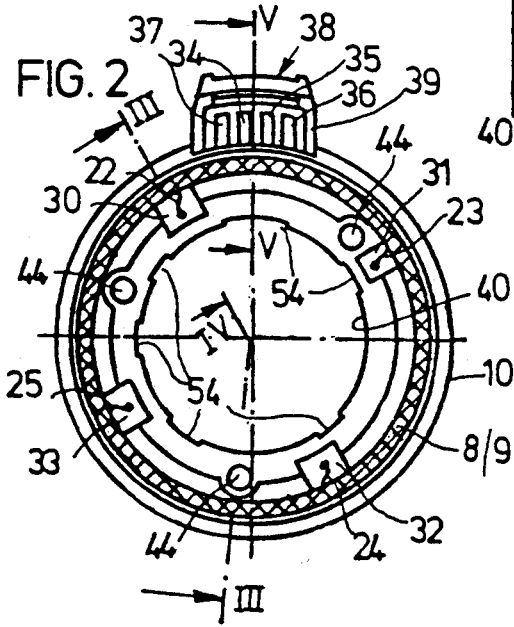
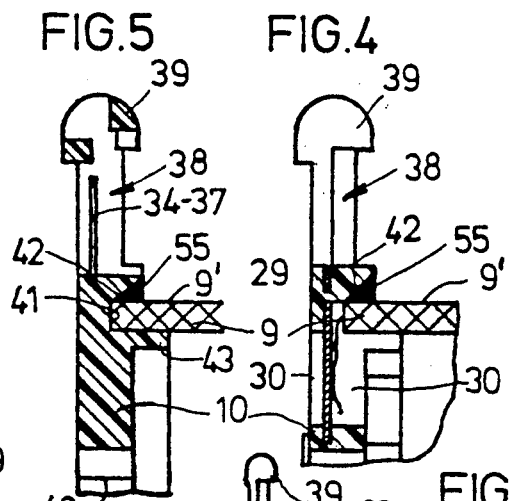
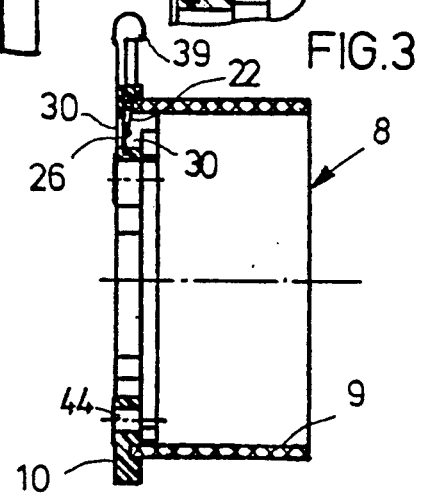

DC MOTOR WITH CORELESS COIL INSTALLATION

This application is a continuation of application Ser. No. 161,303, filed Feb. 25, 1988 which is a continuation of Ser. No. 22,395 filed Mar. 6, 1987 both now abandoned.

The present invention relates to an arrangement of a coreless coil in the cylindrical air gap of a dc motor. Although motors of this type are mass-produced in very large volume, relatively close manufacturing tolerances are required. Consequently, to achieve cost-effective production, the positioning and support and/or fastening of the coreless coil in the motor, such as a stator coil on a fixed bearing hub of the motor shaft, and the electric connection of the winding or stator coil must be designed so as to keep the number of assembly operations and costs involved as low as possible when assembling the individual components in production. In the past coreless windings and coils were secured with ring flanges including a printed circuit board whose electric conductors were run from a common connector to the individual wire ends or loops of the windings and coils. It was necessary to solder the aforesaid wire ends or loops to the tappings in a labor-intensive operation. Existing ring flanges also require a centering ring on which the body of the winding is placed for bonding. The use of this type of ring flange is associated with high production costs, since these connections have to be soldered to printed circuit boards. Moreover, the solder points must be left accessible and require safety clearances. Welds inside the windings and a recessed plate inside the window according to the present invention play an essential part in providing this safety clearance.

One purpose of the present invention is to provide an improved arrangement of the type described at the outset which is more cost-effective and reliable, especially with respect to the integrity of the electrical contacts between the connecting leads and the winding taps, i.e. the ends of the windings and/or the loops of the winding body, whereby connecting conductors are run directly into a flat connection member.

The solution to this problem provides a number of advantages. The conductor leads can be simply installed on the ring flange, which may be molded as a single component or comprise two half-shells which can be joined as one piece by means of snap fastenings. This can be performed in an injection die. Alternatively, if the two half-shell configuration is employed, the conductor lead connection can be carried out when the two half-shells are assembled to form the ring flange, the connectors being employed as pins of a common plug. In addition with this arrangement, all the winding ends and taps can be electrically connected to the individual conductor leads in a single manufacturing operation. This stage can be carried out in a welding jig, wherein electrodes are placed at suitable positions in multiple openings.

In one embodiment of the present invention, all the conductor leads are arranged in the same plane inside the ring flange cross section, thus allowing the use of a relatively thin ring flange, requiring only a limited space envelope in the axial direction. Another arrangement allows the provision of individual connectors at various points on the ring flange, each of which is provided with a separate plug coupling to the electric supply leads. By positioning these connectors on a common connection, they can be connected to the individual conductor leads over a multiple pin plug.

All the connected wire ends and coil loops of the coil can easily be permanently welded to the individual conductor leads at the same time by the provision of external welding electrodes immediately adjacent the conductor leads themselves. The actual welding points remain positioned inside the cylindrical winding in such structure.

An improved and simple means of fastening the coil to the ring flange is also provided, and it is not necessary to insure and/or adjust the centering provided by the centering rib. Consequently, the concentricity of the coil itself and/or of the winding body, on the one hand, and that of the inside profile of the ring flange on the other hand, is insured during the manufacturing process.

The structure facilitates the addition of an adhesive with which the winding body can be bonded to the ring flange.

Further, welding the winding ends and the wire loops of the winding body to the conductor loops not only results in the aforementioned cost reduction, but also provides the advantage of enhanced production quality, in that a welded connection insures the integrity of the electric connection between the individual conductor leads and the ends of the windings. Certain process steps described allow almost optimal utilization of the advantages of the present invention in respect of manufacturing economies as well as quality.

The present invention will now be described in detail with the help of the drawing wherein:

FIG. 1 is a cross section of a dc motor with an external rotor and a coreless stator coil;

FIG. 2 is an end view of a coreless stator coil with a ring flange;

FIG. 3 is a section at III—III of FIG. 2;

FIG. 4 is a partial cross section at III-IV of FIG. 2;

FIG. 5 is a partial cross section at V—V of FIG. 2;

FIG. 11 shows a group of conductor leads after removal of the centering ring and outer connecting bars in the extruded ring flange.

Figure 6:
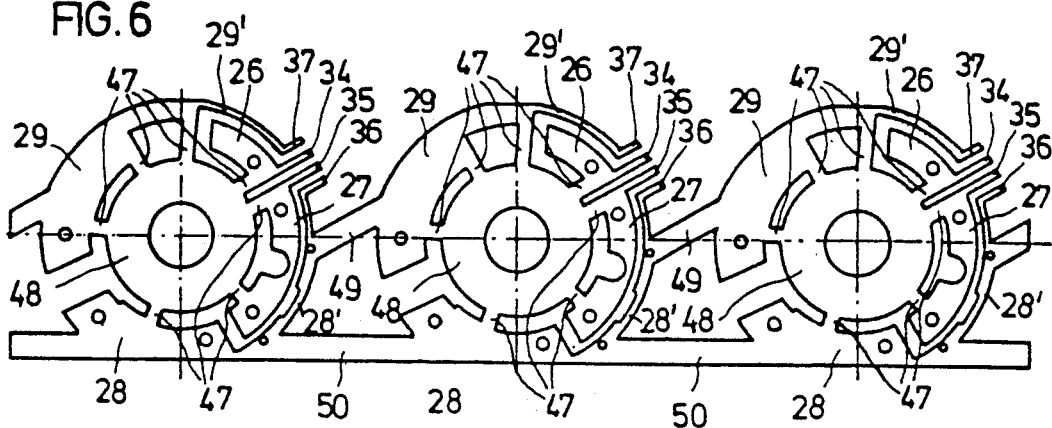
FIG. 6 shows a stamped strip of conductor lead with 3 groups of leads.

The dc motor with an external rotor shown in a cross section in FIG. 1 is provided with a cup-shaped rotor 1 which is centered and firmly fastened on a hub 2 of a hollow return body 4 of ferromagnetic material provided with a cylindrical outer casing. The inside surface 5 of the rotor cup 1 is lined with two permanent magnets of ring sector configuration, forming two ring gaps 7 with the cylindrical outer surface 3 of the return body 4. In the aforesaid ring gaps, a coreless stator coil 8 is arranged whose baked enamel wire windings take the form of an annular self-supporting thin-walled winding body 9. The winding body 9 is stationary and is firmly mounted on a cylindrical section 11 of a bearing hub 12 of a bearing ring 13. The motor shaft 16 is supported in two ball bearings 14 and 15 in the bearing hub 12, so as to be able to rotate, and is firmly fixed in a hub part 17 of the return body 4 by means of a rotary coupling 18. To compensate for axial play a pressure spring 19 is provided, which in turn abuts axially on a disk 20 mounted on the ball bearing 14 on the one hand, and is supported on an annular surface 21 of the return body 4 on the other hand. As can be seen in FIG. 2, the coil 8 is provided with four electric connections 22, 23, 24 and 25, wherein the first two connections 22 and 23 include the wire ends of the winding and the two connections 24 and 25 are tappings taking the form of wire loops of the winding which forms the stator coil 8. The connections 22–25 are welded to conductor leads 26, 27, 28 and 29 (FIGS. 6 & 11) and are thus electrically connected to them. The conductor leads 26–29, which are shown as individual components configured according to FIG. 11, consist of thin strips of a stamped metal sheet or plate 81, preferably made of an easily welded copper alloy, inserted in one plane in a flat insulating plastic ring flange 10 and potted without the conductor leads being brought into contact with one another so as to lie within the annular surface of the ring flange 10 and to be accessible from both sides through window apertures 30, 31, 32 and 33. This structure allows welding electrodes to be placed on the individual conductor leads 26–29 from both sides to provide electric connections between the aforesaid leads and the connecting wires 22–25. To provide the simplest possible connection of the individual conductor leads to the outside, the conductor leads are provided with connecting tongues 34, 35, 36 and 37 projecting radially outwards from the plastic body of the ring flange 10 and are arranged at a common connecting portion 38 on the circumference of the ring flange 10, and the connecting tongues are encompassed by an essentially U-shaped molded protective yoke 39.

Figures 8, 9:
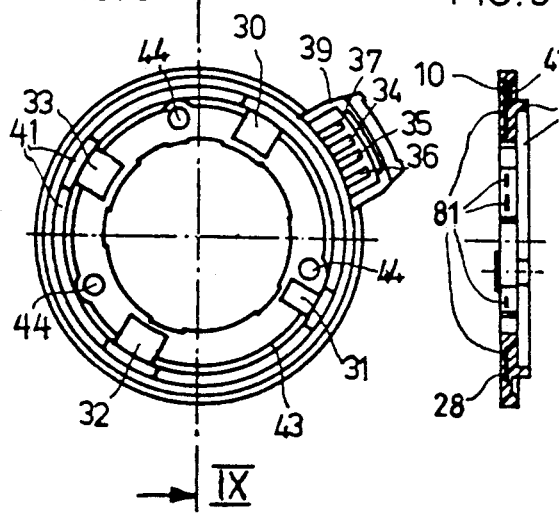
FIG. 8 is an end view of a single ring flange.
FIG. 9 is a section at IX—IX of FIG. 8.
Figure 10:
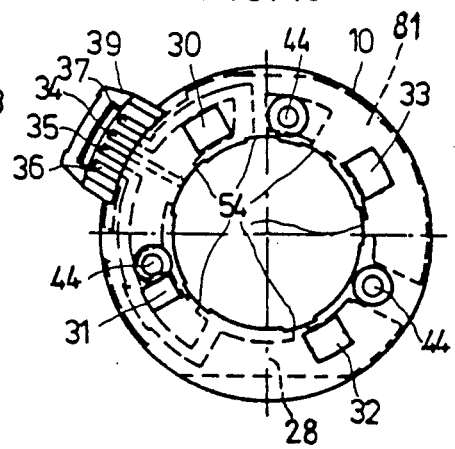
FIG. 10 is the opposite end view of a single ring flange according to FIG. 8.

It can be seen in FIGS. 6 and 11 that the two conductor leads 28 and 29 are connected to the connecting tongues 36 and 37 by narrow linking bars 28' and 29', respectively, which are concentric with the conductor leads 26 and 27. The upper leading edge of the ring flange 10 is provided with an annular groove 41 perfectly concentric with its internal cylindrical contour 40 (FIGS. 5, 8 and 9). The outer boundary wall 42 of this annular groove is oblique and is expanded conically, and is wide enough in a radial direction to be able to accommodate and form one piece with the winding body 9 that forms the stator coil. Together with the external surface 9' of the winding body 9 the aforesaid conical boundary wall 42 forms an annular wedge-shaped groove to accommodate an adhesive 55 (see FIGS. 4 and 5). To provide the stator coil 8 with a more secure seating, an axially projecting circumferential centering rib 43, which is interrupted by the window apertures 30, 31, 32 and 33, is formed along the inner edge of the annular groove 41. Inside the winding body 9, the ring flange 10 is provided with 3 axial drillings 44, staggered at 120 degrees, through which screws 45 (FIG. 1) can be fastened to an annular flange section 46 of the bearing ring 13 to attach the ring flange 10 to the bearing ring 13.

Figure 7:
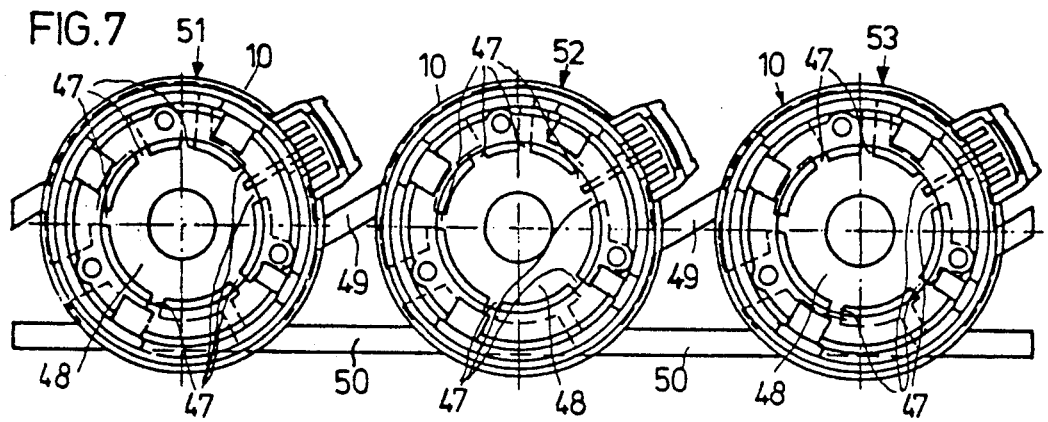
FIG. 7 shows the unseparated stamped strip of conductor lead with the ring flanges according to FIG. 6 molded around them.

As shown in FIG. 6, to realize production of the ring flange 10 along with the inserted conductor leads 26, 27, 28 and 29, as far as possible the conductor leads 26–29 are laid together in a cavity and molded within the ring flange as shown in FIG. 7. Stamped metal strips are connected to one another in groups by means of radial connecting bars 47 extending from a common centering ring 48. Connections to adjacent sets of leads are made by external connecting bars 49 and 50. In this way, at each cycle of the injection molding machine, as shown in the present example, three or more associated ring flange moldings 51, 52 and 53 are produced. These moldings, which are connected to one another by means of the bars 49 and 50, are then placed in a stamping tool in which the connecting bars 47 are completely severed from the connecting bars 49 and 50 in a single step. In this stage of the process, the internal punch, employed to cut the bars 47 together with the centering ring 48, is provided with radial extensions so that the cutting of the bars 47 is carried out at a point of wider diameter than that of the internal cylindrical contour 40. Radial indentations 54 are produced as a result. The purpose of this procedure is to insure that the cut edges of the bars 47 are not brought into contact with the bearing hub 11, which is usually made of electrically conductive metal.

After the stamping stage, the form of the individual ring flanges is as shown in FIGS. 2, 8 and 9, so that only the winding body 9 remains to be mounted as shown in FIGS. 3–5. In other words, the coil body 9 is inserted in the annular groove 41 where it is bonded in place in the triangular cross section of the outer boundary wall 42.

On both sides of the conductor leads, the ring flange 10 is provided with the apertures 30–33, providing access on both sides to the same point on the individual conductor leads 26–29.

The example according to FIGS. 1–11 constitutes an extremely advantageous embodiment of the present invention in instances where it is intended that the coreless annular winding be employed as a stator coil. Such a winding is continuously wound with the usual type of taps uniformly distributed along its circumference, as already described.

Figure 12:
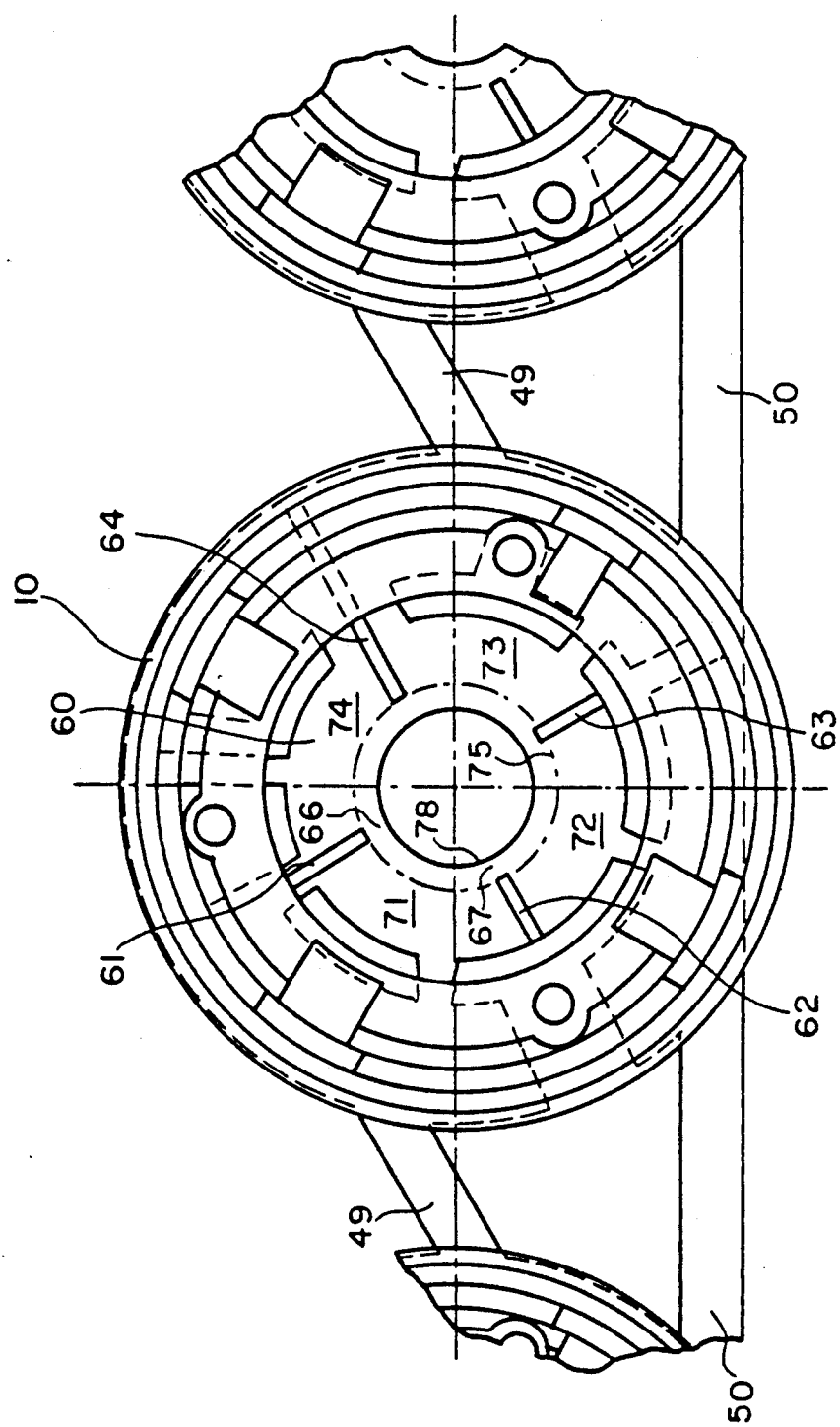
FIG. 12 shows a further embodiment of the present invention.

This type of winding, however, can also be operated as a rotary component, wherein the permanent magnets are provided on the stator instead of the rotor. This can be arranged radially at the cylindrical air gap inside or outside the coil, together with soft magnetic return cylinder surfaces. In this arrangement of the rotary winding, current must be mechanically switched to the winding and the stamped plate 81 is preferably employed, but instead of being extended outwards, the radial conductors extend inwards and become a ring which is widened in a radial direction. As shown in FIG. 12, exactly the same type of plate 81 is also drawn inwards in a radial direction and is provided with a wide edge strip 60 whose periphery is divided by radial slots 61, 62, 63 and 64 which do not quite extend as far as the inside edge, so that small ring bars, of the type shown at 66, 67 remain.

FIG. 12 thus has a similar stamping part to the one shown in FIG. 6, from which the external radial connections are however omitted. As a consequence, the wider ring part 60 is provided on the inside. The plastic molding is also moved somewhat further inwards in a radial direction so that brush surfaces 71, 72, 73 and 74 are naturally completely molded at the same time as the outer radial plastic ring described in the first embodiment of the present invention. After molding, the ring part 60 is cut off approximately as far as the annular line 75 shown here as a dash-dotted line. In other words, its original inner edge 78 is increased to the circular edge 75 indicated by the dash-dotted line. As a result, the ring bars 66, 67 etc. are eliminated, and the surfaces 71, 72, 73 and 74 are thus electrically insulated from one another. Outside the brush path, the apertures are molded with plastic like a planar collector in the usual way and the laminations 71, 72, 73 and 74 are connected to electrically conductive surfaces of the metal strips 30, 33, 32 and 31 in the window opening where the ring winding taps are welded in position as in the first embodiment. The planar brush can only be arranged so the brushes themselves either lie outwards of the ring winding body 9 in an axial direction, or alternatively, inboard of the ring winding body, as desired. The arrangement selected will depend on the space envelope and the motor design.

I claim:

1. A dc motor having a stator and a rotor, the two separated from one another by a cylindrical air gap, comprising:
   a coreless coil wound in a self-supporting manner from baked enamel wire into a thin-walled, cylindrical body form;
   a plurality of electrical connectors provided on the coil, including the coil ends and intermediate taps in the form of wire loops, all extending from the coil body;
   a ring flange having insulation on at least one of its faces receiving the mounting of the coreless coil;
   a thin, flat metal electrical connecting plate included in the ring flange;
   a plurality of conductor paths electrically isolated from each other formed in the connecting plate, at least one conductor path being provided for each electrical connector on the coil, and the insulation separating the coil body from the isolated conductor paths when the coil is so mounted;
   an aperture provided in the insulation for each conductor path through which the conductor path is accessible for direct connection thereto of a respective connector of the coil body; and
   an electrical contact surface extending radially from each of the conductor paths for further electrical connections from the outside of the motor.

2. A motor in accordance with claim 1 wherein the individual conductor paths are formed in an annular manner and are provided with radial sections which run concentrically to one another.

3. A motor in accordance with claim 1, wherein the radially extending contact surfaces are in the form of connecting tongues formed on the conductive paths and directed to a common connecting location positioned radially outside the ring flange, and whereby in the coreless coil is formed as a stator.

4. A motor in accordance with claim 1 wherein the ring flange on the internal edge of an annular groove formed to accommodate the diameter and the thickness of the body of the coreless coil, has a centering corrugation formed integral therewith but interrupted by the apertures.

5. A motor in accordance with claim 4, wherein an external limiting surface of the annular groove runs radially obliquely, in such a manner that it forms a circular wedge groove with the external surface of the coreless coil body.

6. A motor in accordance with claim 1, wherein the coil ends and taps are welded, in the manner of wire loops, onto the respective conductor paths.

7. A motor in accordance with claim 1 wherein the conductor paths connect to points located radially inside the ring flange, and wherein the coreless coil is mounted to rotate.

8. A motor in accordance with claim 7, wherein the radial internal connecting points are equally distributed on the circumference and form brush surfaces of a planar collector.

9. A motor in accordance with claim 1, wherein a plurality of conductor paths in common on a ring flange are connected with one another through a common centering ring in the manner of a stamped strip, and by means of external connecting bars, being inserted in common into a molding form and molded in one operation.

10. A motor in accordance with claim 2 wherein the radially extending contact surfaces are in the form of connecting tongues formed on the conductive paths and directed to a common connecting location positioned radially outside the ring flange, and wherein the coreless coil is formed as a stator.

11. A motor in accordance with claim 2 wherein the ring flange on the internal edge of an annular groove formed to accommodate the diameter and the thickness of the body of the coreless coil, has a centering corrugation formed integral therewith but interrupted by the apertures.

12. A motor in accordance with claim 2 wherein the coil ends and taps are welded, in the manner of wire loops, onto the respective conductor paths.

13. A motor in accordance with claim 2 wherein the conductor paths connect to points located radially inside the ring flange, and wherein the coreless coil is mounted to rotate.

14. A motor in accordance with claim 2 wherein a plurality of conductor paths in common on a ring flange are connected with one another through a common centering ring in the manner of a stamped strip, and by means of external connecting bars, being inserted in common into a molding form and molded in one operation.

* * * * *

UNITED STATES PATENT AND TRADEMARK OFFICE
CERTIFICATE OF CORRECTION

PATENT NO. : 5,006,765
DATED : April 9, 1991
INVENTOR(S) : Fritz Schmider

It is certified that error appears in the above-identified patent and that said Letters Patent is hereby corrected as shown below:

ON TITLE PAGE:

[57] ABSTRACT, line 3, after "by" insert --a plurality of--.

IN THE CLAIMS:

Column 5, line 50, change "whereby" to --wherein--.

Column 5, line 50, after "wherein" delete "in".

Signed and Sealed this

First Day of September, 1992

Attest:

DOUGLAS B. COMER

*Attesting Officer*    Acting Commissioner of Patents and Trademarks